US006452921B1

(12) United States Patent
Alexander, Jr. et al.

(10) Patent No.: US 6,452,921 B1
(45) Date of Patent: Sep. 17, 2002

(54) METHOD AND SYSTEM WITHIN A COMPUTER NETWORK FOR MAINTAINING SOURCE-ROUTE INFORMATION AT A ROUTER BYPASSED BY SHORTCUT COMMUNICATION

(75) Inventors: Cedell Adam Alexander, Jr., Durham; Russell Eugene Gardo, Raleigh; Brahmanand Kumar Gorti, Cary; Olen Lee Stokes, Jr., Morrisville, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/199,071

(22) Filed: Nov. 24, 1998

(51) Int. Cl.[7] .............................................. H04L 12/28
(52) U.S. Cl. ............. 370/351; 370/395.52; 370/395.53; 370/395.54; 370/401
(58) Field of Search ................................ 370/355, 351, 370/395.1, 397, 395.52, 395.53, 395.54, 401, 402, 403, 404, 465, 466, 467, 469

(56) References Cited

U.S. PATENT DOCUMENTS

| 5,265,092 A | | 11/1993 | Soloway et al. | |
|---|---|---|---|---|
| 5,347,272 A | | 9/1994 | Ota | |
| 5,442,633 A | | 8/1995 | Perkins et al. | |
| 5,583,996 A | | 12/1996 | Tsuchiya | |
| 5,636,216 A | | 6/1997 | Fox et al. | |
| 5,809,233 A | * | 9/1998 | Shur | 370/402 |
| 5,822,320 A | * | 10/1998 | Horikawa et al. | 370/401 |
| 5,909,441 A | * | 6/1999 | Alexander, Jr. et al. | 370/401 |
| 5,996,021 A | * | 11/1999 | Civanlar et al. | 370/389 |
| 6,172,981 B1 | * | 1/2001 | Cox et al. | 370/401 |
| 6,178,171 B1 | * | 1/2001 | Alexander, Jr. et al. | 370/401 |

FOREIGN PATENT DOCUMENTS

| EP | 0790751 A2 | 8/1997 |
|---|---|---|
| JP | 2056100 A | 2/1990 |
| JP | 5075623 A | 3/1993 |

OTHER PUBLICATIONS

Alexander, MPOA BASICS, IBM, pp. 1–26, Oct. 7, 1997.*
ATMF/95–0824r6, Baseline Text for MPOA, pp. 1–39, Feb. 26, 1996.*
IBM Technical Disclosure Bulletin, "Fully Covered System Interconnect Via Edge–Disjoint Rings," vol. 38, No. 11, Nov. 1995, pp. 251–252.
IBM Technical Disclosure Bulletin, "New Routing Algorithms for Large Interconnected Networks," vol. 35, No. 1A, Jun. 1992, pp. 436–437.

(List continued on next page.)

Primary Examiner—Wellington Chin
Assistant Examiner—Frank Duong
(74) Attorney, Agent, or Firm—Gerald R. Woods; Bracewell & Patterson, LLP (57) ABSTRACT

In a data communication internetwork including a source station, an end station, and a default router for the source station, a default communication path including the default router is defined between the source station and the destination station. During operation of the data communication internetwork, a shortcut data communication path by passing the default router is established between the source station and the destination station, such that data packets transmitted by the source station are not received by the default router. After the shortcut communication path has been established, a control frame containing source-route information regarding the source station is transmitted to the router, and the source-route information is stored at the router. In this manner, the default router can efficiently direct data packets to the source station and facilitate the establishment of shortcut communication paths terminating at the source station even though the default router is bypassed by a shortcut communication path.

28 Claims, 3 Drawing Sheets

OTHER PUBLICATIONS

IBM Technical Disclosure Bulletin, "Reconfigurable–MetAnet: Fault–Tolerant Routing and Flow–Control Mechanism on Locally–Ordered Ring–in–Tree Embedding," vol. 38, No. 8, Aug. 1995, pp. 5–9.

IBM Technical Disclosure Bulletin, "Switched Multimegabit Data Services Physical Cut–Through Mechanism," vol. 39, No. 7, Jul. 1996, pp. 275–279.

Alles, ATM Internetworking, Cisco Systems, Inc., pp. 1–58, May 1995.*

Heinanen, RFC 1483, Multiprotocol Encapsulation over ATM Adaptation Layer 5, IETF. org, Jul. 1993.*

Giordano et al, IP and ATM—a position paper, Swiss Federal Institute of Technology Lausanne, pp. 1–45, Jul. 1997.*

* cited by examiner

METHOD AND SYSTEM WITHIN A COMPUTER NETWORK FOR MAINTAINING SOURCE-ROUTE INFORMATION AT A ROUTER BYPASSED BY SHORTCUT COMMUNICATION

BACKGROUND OF THE INVENTION

1. Technical Field

The present invention relates in general to data communication and in particular to data communication in a computer network. Still more particularly, the present invention relates to method and system in a computer network for maintaining source-route information at a router located within a default communication path between two devices when the router is bypassed by shortcut communication between the two devices.

2. Description of the Related Art

Generally speaking, two broad categories of communication protocols are utilized in data communication networks: broadcast protocols and unicast (point-to-point) protocols. In data communication networks that implement a conventional broadcast protocol, a source station transfers data to a destination station by broadcasting a data packet containing the destination station's address to all stations attached to the network. In response to sensing a data packet containing its address, the destination station receives the data packet from the network; all other stations ignore the data packet. Because every data transfer between a source station and a destination station in a broadcast network requires broadcasting data packets in this manner, broadcast networks are designed to support only a relatively small numbers of stations. A conventional broadcast network's limited bandwidth would be overwhelmed by the number of broadcast packets if a large number of stations were attached.

Because of the bandwidth limitations of individual broadcast networks, broadcast networks are often implemented as a series of interconnected subnetworks (or subnets). Such a network architecture is also a natural outgrowth of the desirability of interconnecting each new local area network (LAN) with preexisting LANs. Communication between subnetworks that each form a portion of a larger internetwork is accomplished by devices called routers, which provide layer-3 (i.e., network) connectivity between subnetworks according to the International Organization for Standardization Open Systems Interconnection (ISO/OSI) model. Thus, when a source station desires to transfer data to a destination station in a different subnetwork of a broadcast internetwork, the source station broadcasts, on its subnetwork, a data packet containing the address of a destination station. The broadcast data packet is received by each station in the source station's subnetwork, including a router. In response to sensing the destination station's address, the router receives the data packet from the source station's network and broadcasts the data packet on the destination station's subnetwork, to which the router is also attached. As described above, in response to sensing a data packet specifying its address, the destination station receives the data packet from its network, while all other stations on the destination station's subnetwork ignore the data packet.

Because of the size limitation and inherent inefficiency of networks that implement broadcast protocols, there has been increased interest in unicast protocols that permit point-to-point data communication. One emerging network technology that permits such connection-oriented communication is asynchronous transfer mode (ATM). An ATM protocol is defined in "ATM User-Network Interface (UNI) Signaling Specification, Version 4.0," which is promulgated by the ATM Forum Technical Committee and incorporated herein by reference. In an ATM network, a source station negotiates a connected path to a desired destination station before the source station proceeds to transmit its data to the destination station. The ATM protocol defines the communication required to establish such a point-to-point connection. Once a point-to-point connection has been established, the source station transmits its data only to the destination station using unicast frames. Thus, unicast protocols, such as ATM, address the shortcomings of conventional broadcast protocols by providing high speed, low bandwidth communication.

When only communication speed and data throughput are considered, it would be desirable to replace the installed base of non-ATM protocol networks (e.g., Wide Area Networks (WANs), Local Area Networks (LANs), Internet Protocol Networks) with high speed connection-oriented network technologies such as ATM. However, because the expense of replacing the enormous number of installed broadcast networks is prohibitive and because some of the non-ATM protocol networks have features that are not directly supported by ATM protocol networks, industry has taken a gradual approach to upgrading network technologies. Under this approach, the communication industry has opted to move toward ATM protocol networks while simultaneously continuing to support the vast installed base of non-ATM protocol networks and the network and link layer protocols operating on the non-ATM networks until the non-ATM networks are phased out. The key to this strategy is empowering the ATM protocol networks to be able to support non-ATM protocols, and to be able to support non-ATM features that users (and user's systems) have come to expect and rely upon.

The telecommunications industry has opted to provide such support and supply such features via various overlay schemes. These overlay schemes, while representing a number of different implementations, all support any non-ATM capability with a logically separate protocol that is logically overlaid onto a base ATM protocol network. The logically overlaid protocol is then utilized to allow non-ATM protocol networks to interact with ATM protocol networks as if the ATM protocol networks were a part of, and hence recognize the protocols and support the features of, non-ATM protocol networks.

One scheme for supporting conventional LAN technology in the context of ATM includes the implementation of a Logical IP Subnetwork (LIS), which is a ISO/OSI layer-3 subnetwork within an ATM network. The ATM network serves as a direct replacement for the physical LAN segments connecting traditional layer-3 source and destination stations (collectively, end stations) and routers. Communication between end stations within the same LIS is accomplished utilizing the ATM protocol. In order for a source station to establish a connection with a destination station within the LIS, the source station must learn the ATM address of the destination station. Accordingly, the source station sends an ATM Address Resolution Protocol request (ATMARP —Request) to an ATM Address Resolution Protocol (ARP) Server, which resolves the destination station's layer-3 address (i.e., the address by which the destination station is identified with respect to its subnet) into an ATM address that the source station can utilize to obtain a point-to-point connection. By contrast, communication between end stations in different LISs is performed as if the end stations resided in different traditional LANs. The source station transmits the data traffic to a router based on the layer-3 address of the destination station. After determining the appropriate destination address (and protocol) by reference to a table, the router then forwards the data to the appropriate destination LIS or to a second router, if the router on the source LIS is not a member of the destination LIS.

Another mechanism for supporting conventional broadcast technology in an ATM environment is an emulated LAN (ELAN), which supports the use of IEEE 802 LAN protocols, such as Ethernet and Token Ring protocols, within an ATM protocol network. Communication within an ELAN is governed by a LAN emulation (LANE) protocol, such as "LAN Emulation Over ATM Version 2—LUNI Specification" (AF-LANE-0084.000), which is promulgated by the ATM Forum and incorporated herein by reference. The LANE protocol defines a service interface for higher layer (that is, network layer) protocols, which is identical to that of legacy LANs, and requires that data sent across the ATM network are encapsulated in the appropriate LAN MAC (medium access control) packet format. LANE does not emulate the actual media access control protocol of the specific LAN concerned (that is, CSMA/CD for Ethernet or token passing for Token Ring LANs). In other words, a LANE protocol makes an ATM protocol network appear and behave like an Ethernet or Token Ring LAN. The rationale for layering protocols in this manner is that no modifications to higher layer protocols are required in order to enable their operation over an ATM network and no changes are required in network layer drivers since the LANE service presents the same service interface as existing MAC protocols.

The LANE protocol referenced above defines the operation of a single emulated LAN (ELAN), which may be one of multiple ELANs on a single ATM network. A conventional ELAN is composed of a LAN Emulation Server (LES), LAN Emulation Clients (LECs) of the LES, and a Broadcast and Unknown Server (BUS) and is managed by a LAN Emulation Configuration Server (LECS). Often, LECs serve an intermediary between a legacy LAN and an ATM network in which an ELAN has been established, communicating with the attached legacy LAN utilizing conventional LAN protocols and communicating with other entities on the ELAN as described below.

To establish communication between two LECs on a ELAN, the source LEC first tries obtain the ATM address of the destination LEC, given the destination LEC's MAC address. To obtain the ATM address of the destination LEC, the source LEC issues a LANE Address Resolution Protocol Request (LE_ARP_Request) to the LES. Provided the destination station has previously registered its MAC address/ATM address pair with the LES serving the ELAN, the LES returns the ATM address of the destination LEC to the requesting LEC in an ELAN Address Resolution Protocol Reply (LE_ARP_Reply). The source LEC can then use the received ATM address to establish a connection to unicast data to the destination LEC, a so-called data-direct Virtual Channel Connection (VCC), and transmit its data to the destination LEC via the VCC.

If the destination LEC has not registered with the LES, the source LEC communicates with the destination LEC using a conventional LAN methodology mediated through a Broadcast and Unknown Server (BUS). The LEC first sends its data packets to the BUS, which broadcasts the data packets to each station in the ELAN. As in a legacy LAN, the broadcast data packets are received from the network by the destination LEC and are ignored by other stations on the network. Exactly the same process is used if a destination station for data communication is on a legacy LAN or an ELAN in a different layer-3 subnetwork. In these cases, the broadcast data packets are received by a router connected to the ELAN and forwarded via layer-3 protocols to the destination, as described hereinabove, just as if the ELAN were a legacy LAN.

In prior art networks, communication between a LIS attached station and an ELAN attached station of an ATM network also proceeds by router-connected paths. Without a mechanism for resolving the ATM address of a destination station, a source station attached to a LIS cannot exploit the ATM network to which it is attached, and data packets are sent to a router connecting the layer-3 subnets, which forwards the data packets via layer-3 protocols to the layer-3 subnet in which the destination station resides. The routed path through the network may involve forwarding the data from the source station to the destination station through one or more routers, where each such forwarding event is referred to as a "hop." Transferring data from the source station to the destination station in this way, via a series of hops, subverts the benefits of the ATM because the source station is not exploiting the ATM connection-oriented infrastructure.

In order to eliminate hops in data communication within a LANE environment, the Next Hop Resolution Protocol (NHRP) was developed. NHRP forms Annex C of the Multi-protocol over ATM (MPOA) specification entitled "Multi-protocol Over ATM, Version 1.0.," (AF-MPOA-0087.000), which is promulgated by the ATM Forum and incorporated herein by reference in its entirety. NHRP is a protocol that allows an entity, such as a host, connected to a layer-3 subnet of an ATM network to determine the ATM address of the next hop associated with a destination station. The next hop may be, for example, the destination station itself or a router "nearest" the destination station that provides egress from the ATM network to an LAN attached destination host. Utilizing the next hop ATM address, NHRP permits an ATM VCC shortcut path for data packets to be established between stations in lieu of the default routed path.

In ATM protocol networks, it is frequently the case that LAN devices communicating with one another are behind LANE edge devices (i.e., bridge devices located between one or more LAN interfaces and one or more LECs). If only LANE and NHRP are implemented, the LANE edge devices must be full function routers in order to establish an ATM VCC in accordance with the LANE and NHRP protocols. To eliminate this requirement, MPOA was developed. MPOA allows LANE edge devices to perform internetwork layer forwarding and establish ATM VCCs without requiring that the LANE edge devices be full function routers. As described in detail in the MPOA specification incorporated by reference above, MPOA defines MPOA clients (MPCs), which issue queries for shortcut ATM addresses, and MPOA servers (MPSs), which service such shortcut queries in order to identify the optimal exit point for data packets from the ATM "cloud."

When a router in an MPOA protocol network first receives a data packet from a source station (e.g., a Token Ring attached device), the router examines the data packet and caches the source-route information contained in the data packet in association with the source station. However, if the router receives no data packets from the source station over a long period of time (typically 2 to 5 minutes), the router will age out the source-route information from its cache. Thus, in many conventional MPOA protocol networks, a router cannot learn or maintain a source-route to an end station without receiving data packets from that end station.

However, as discussed above, an MPOA protocol network permits an MPC to establish an ATM VCC bypassing the source station's default router utilizing an ATM address supplied by an MPS. The present invention recognizes that bypassing a source station's default router in this manner can cause two problems. First, in the absence of a known source-route, data packets received by the default router that target the source station must be broadcast as explorer packets on the ELAN in which the MPC resides, thereby severely degrading network performance. Second, an MPOA shortcut (i.e., ATM VCC) cannot be established or maintained in the reverse direction (i.e., with the source station as the target) because the source-route information must be present at the default router in order to discover the MPC associated with the target station utilizing the discovery mechanism of the MPOA standard.

Some layer-3 protocols have mechanisms that can be employed to address this problem. For example, the IP_ARP function can be used for IP (Internet Protocol). An MPS can perform an IP_ARP to obtain the source-route to an IP end station because the IP end station will respond to the MPS with a packet that contains the source-route. However, not all layer-3 protocols have such a mechanism. For example, IPX (Internet Protocol exchange) does not include such a mechanism. For IPX, an MPS cannot send a packet over the ELAN that would generate a response to the MPS from the end station for which the source-route is needed. Therefore, the present invention solves the problem for such protocols (e.g., IPX) in an MPOA network.

SUMMARY OF THE INVENTION

To overcome the aforementioned and other shortcomings of the prior art, the present invention provides an improved communication methodology in a data communication internetwork including a source station, an end station, and a default router for the source station. In this data communication internetwork, a default communication path including the default router is defined between the source station and the destination station. During operation of the data communication internetwork, a shortcut data communication path bypassing the default router is established between the source station and the destination station, such that data packets transmitted by the source station are not received by the default router. After the shortcut communication path has been established, a control frame containing source-route information regarding the source station is transmitted to the router, and the source-route information is stored at the router. In this manner, the default router can efficiently direct data packets to the source station and facilitate the establishment of shortcut communication paths terminating at the source station even though the default router is bypassed by a shortcut communication path.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
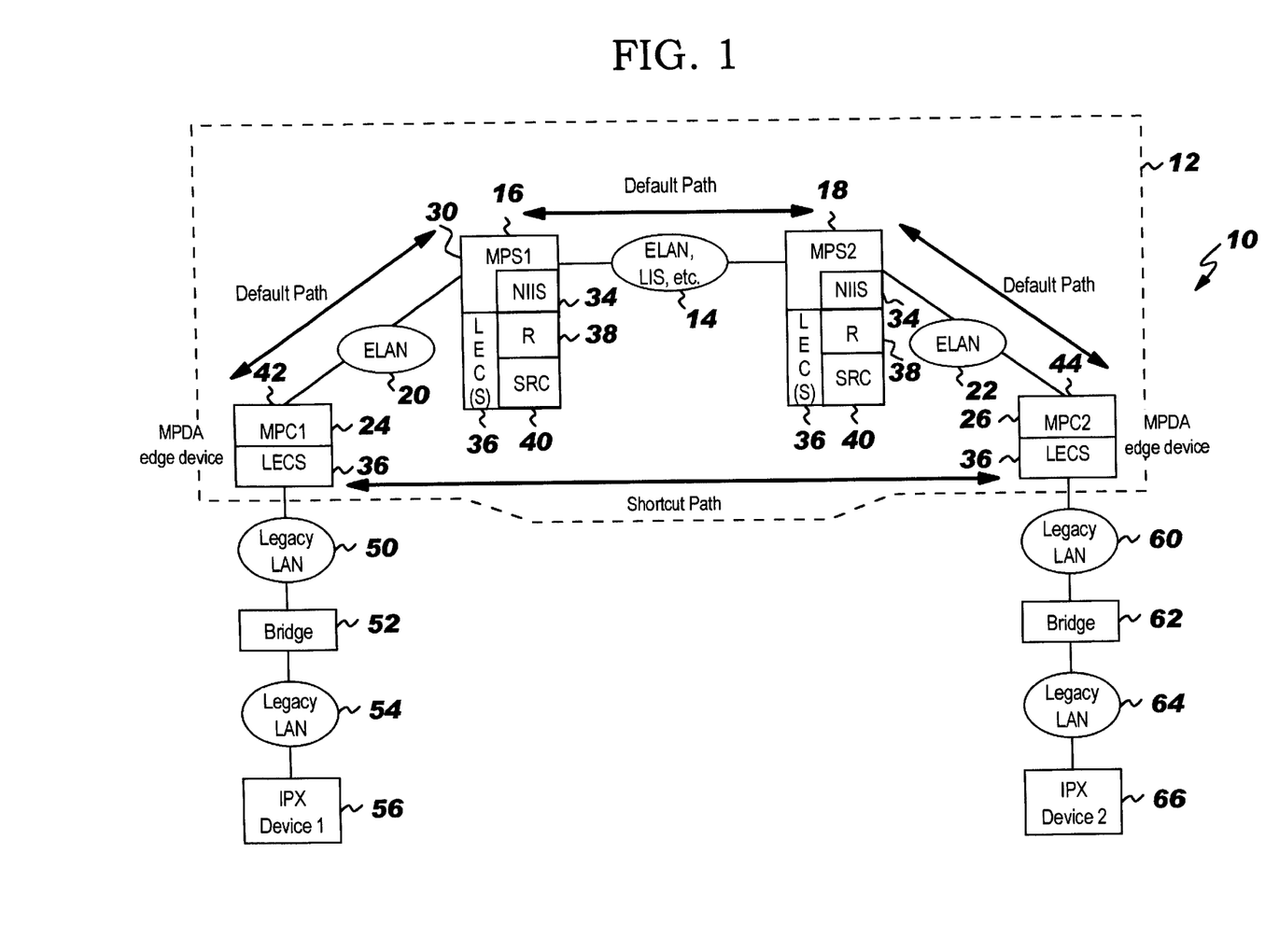
FIG. 1 depicts an illustrative embodiment of a data communication internetwork in accordance with the present invention.

With reference now to the figures and in particular with reference to FIG. 1, there is depicted an illustrative embodiment of a data communication internetwork 10 in accordance with the present invention. As depicted, data communication internetwork 10 includes an MPOA protocol network 12 containing an ATM emulated subnet 14, which as indicated in FIG. 1, can be an ELAN or LIS, for example. ATM emulated subnet 14 has a first router 16 and a second router 18 attached. Routers 16 and 18 each link ATM emulated subnet 14 with a respective one of ELANs 20 and 22. ELAN 20 has an attached MPOA edge device 24, and ELAN 22 has an attached MPOA edge device 26. As will be appreciated by those skilled in the art, MPOA protocol network 12 also contains many other conventional components, such as LESs, BUSs, LECS, that are utilized to implement the ATM and LANE protocols, but are omitted from FIG. 1 in order to avoid obscuring the present invention.

Routers 16 and 18 are hardware devices that support communication across subnet boundaries using an internetwork layer (layer-3) protocol. Routers 16 and 18 may each be implemented as a specially programmed general-purpose data processing system (e.g., workstation computer) or special-purpose data processing system (e.g., network routing hardware). As illustrated, in addition to data processing resources routers 16 and 18 each contain a respective MPS 30, 32, which is a logical component that provides internetwork layer forwarding information to requesting MPCs according to the MPOA protocol. Each of MPSs 30, 32 logically includes a NHRP server (NHS) 34 to provide next hop information to requesting next hop clients. In addition to a respective one of MPSs 30, 32, routers 16 and 18 each contain one or more LECs 36 and a routing function 54 that forwards data packets between subnets by reference to source-route information stored in a source-route cache (SRC) 40. Although illustrated separately in FIG. 1 for the sake of clarity, one or more MPCs may also reside in each of routers 16 and 18.

As illustrated in FIG. 1, each of MPOA edge devices 24 and 26 contains one more LECs 36 that support LANE communication and provide an interface (bridge) between ELANs 20 and 22 and the associated legacy (e.g., Ethernet or Token Ring) LANs. In addition, MPOA edge device 24 contains at least a first MPC 42, and MPOA edge device 26 contains at least a second MPC 44. As will be appreciated by those skilled in the art, the primary function of MPCs 42 and 44 is to source and sink internetwork shortcuts. To provide this function, MPCs 42 and 44 perform internetwork layer forwarding of data packets across subnet boundaries, but do not run internetwork layer routing protocols. MPOA edge devices 24 and 26 are preferably implemented as specially programmed special-purpose data processing systems (e.g., network bridges), but can also be implemented with general-purpose data processing hardware programmed to perform a bridging function.

Still referring to FIG. 1, MPOA edge device 24 is coupled to an internetwork of legacy LANs including legacy LAN 50, bridge 52, and legacy LAN 54, which has an attached first Internet Protocol exchange (IPX) device 56. MPOA edge device 26 is similarly coupled to an internetwork of legacy LANs including legacy LAN 60, bridge 62, and legacy LAN 64, which has an attached second IPX device 66. As shown, the default routed communication path between first IPX device 56 and second IPX device 66 includes MPOA edge device 24, ELAN 20, router 16, ATM emulated subnet 14, router 18, ELAN 22, and MPOA edge device 26. According to the MPOA protocol, in order to achieve more efficient communication across MPOA protocol network 12, a shortcut path can be established by MPCs 42 and 44 that bypasses both router 16, the default router of first IPX device 56, and router 18, the default router of second IPX device 66. As discussed above, establishing an MPOA shortcut like that illustrated in FIG. 1 can prevent bypassed routers, such as routers 16 and 18, from receiving data packets from end stations, such as IPX devices 56 and 66. In the prior art, such bypassed routers were unable to maintain source-route information for end stations having shortcuts. However, in accordance with the present invention and as described in detail below, bypassed routers 16 and 18 are able to maintain source-route information for end stations communicating via an MPOA shortcut.

Figure 2:
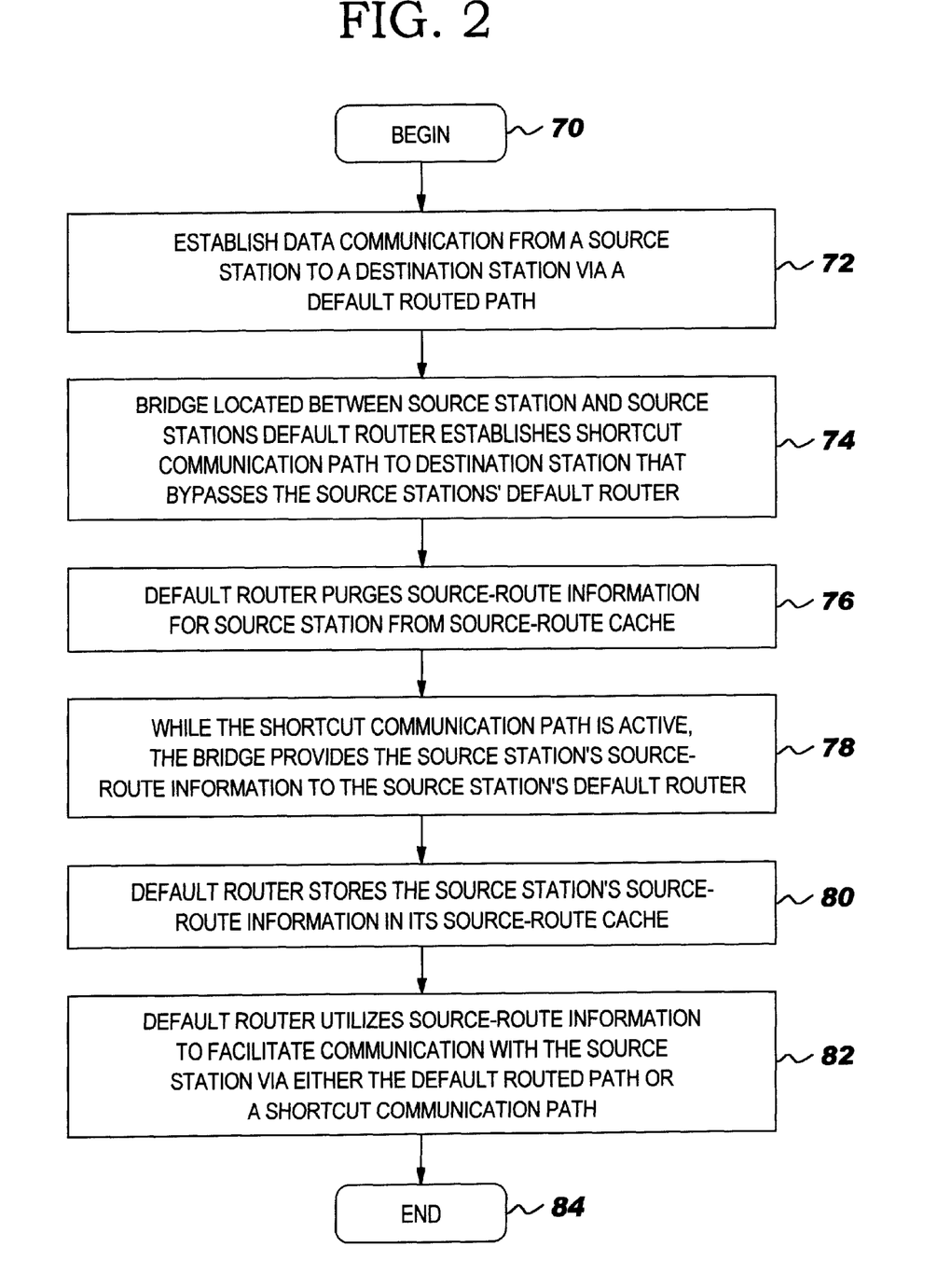
FIG. 2 is a high level logical flowchart of a method for maintaining source-route information within a bypassed router in accordance with the present invention.

Referring now to FIG. 2, there is illustrated a high level logical flowchart of an exemplary method for maintaining, in a default router, source-route information for an end station communicating via a shortcut path that bypasses the end station's default router. As illustrated, the process begins at block 70, and thereafter proceeds to block 72, which illustrates a source station establishing communication with a destination station via a default routed path. The default routed path includes the source station's default router, which learns the source-route information of the source station from data packets received from the source station and stores the source-route information in its source-route cache. Next, as depicted at block 74, a bridge located in the default routed path between the source station and the source station's default router establishes a shortcut communication path to the destination station that bypasses the default router. The bridge may establish the shortcut communication path, for example, in response to receiving a threshold number or threshold rate of data packets from the source station that are addressed to the destination station. Following establishment of the shortcut communication path, all data packets communicated from the source station to the destination station are conveyed via the shortcut communication path. As a result of being bypassed by the flow of data packets from the source station to the destination station, the source-route information of the source station will age out of the default router's source-route cache, if the default router does not receive data packets from the source station via other connections. The purging of the source station's source-route information from the default router's source-route cache is illustrated at block 76.

The process then proceeds from block 76 to block 78, which depicts the bridge supplying the source-route information of the source station to the source station's default router during the shortcut communication between the source station and the destination station. Depending upon implementation, the bridge can supply the source-route information either of its own initiative or in response to receipt of an explicit request from the default router. As shown at block 80, in response to receipt from the bridge of the source-route information for the source station, the default router stores the source-route information in its source-route cache. Thus, as indicated at block 82, the default router can access the source-route information to facilitate communication from another end station to the source device via either the default routed path or a shortcut communication path.

Figure 3:
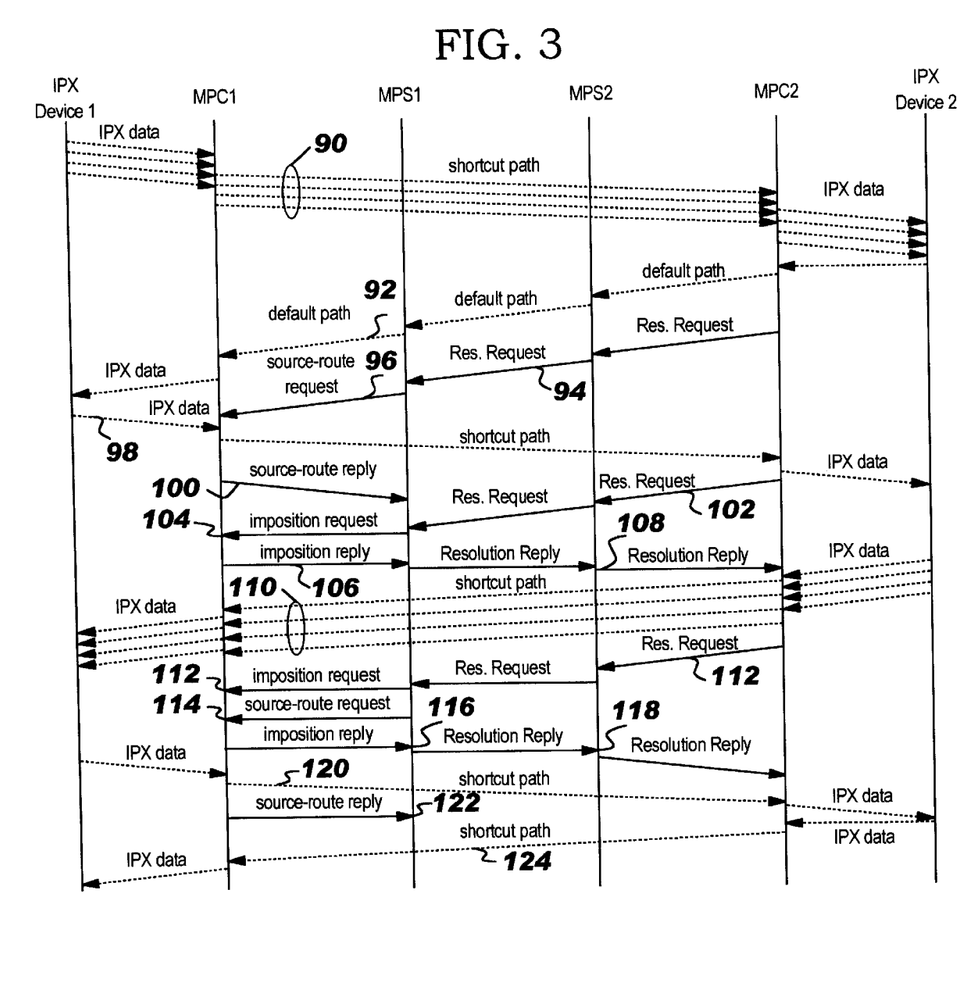
FIG. 3 is a flow diagram depicting how the method of FIG. 2 may be implemented within the data communication internetwork illustrated in FIG. 1.

In order to further explain how the high level logical flowchart given in FIG. 2 may be applied to a particular data communication internetwork, FIG. 3 illustrates exemplary data and control flows in accordance with the present invention in the context of data communication internetwork 10 of FIG. 1. As indicated at reference numeral 90, data packets are first illustrated flowing between first IPX device 56 and second IPX device 66 via an MPOA shortcut communication path linking MPCs 42 and 44. Data packets have been flowing over the shortcut communication path long enough for router 16 to have deleted its copy of the source-route to first IPX device 56 from SRC 40. At this point in time, any data packets transmitted from second IPX device 66 to first IPX device 56 are flowing at a slow enough rate that MPC 44 has not requested the establishment of an MPOA shortcut. Thus, data packets flowing from IPX device 66 to IPX device 56 follow the default routed path, as indicated at reference numeral 92.

Once the data rate of communication from IPX device 66 to IPX device 56 has exceeded a predetermined threshold rate known to MPC 44, MPC 44 transmits a resolution request to the default router of IPX device 56 (i.e., router 16) via the default routed path in accordance with the MPOA protocol. This resolution request is illustrated at reference numeral 94. However, this resolution request (i.e., request for an MPOA shortcut) cannot be immediately serviced by MPS 30 because the source-route of IPX device 56 is not stored within SRC 40 of router 16. In accordance with the present invention, the resolution request is not denied or ignored. Instead, MPS 30 transmits a source-route request to MPC 42, asking MPC 42 to obtain the source-route to the MAC address of IPX device 56, as illustrated at reference numeral 96.

In a preferred embodiment of the present invention, this source-route request complies with the MPOA protocol in that the source-route request is formatted as an NHRP vendor-private extension of an NHRP/MPOA control frame (e.g., an MPOA cache imposition request or an MPOA purge request) sent from MPS 30 to MPC 42. The NHRP vendor-private extension is a TLV (type-length-value) data set appended after the fixed header, common header, client information element(s), and other extension(s), if present, of the NHRP/MPOA control frame. The type field of the source-route request identifies the TLV as a source-route request by a unique extension-type identifier (e.g., 0×1010); the length field of the source-route request specifies the length of the MAC address of IPX device 56 (e.g., 6 bytes), and the value field of the source-route request specifies the MAC address of IPX device 56.

In response to receipt of the source-route request from MPS 30, MPC 42 begins monitoring for data packets sourced by IPX device 56 and destined for MPS 30. At any one time, MPC 42 may be monitoring for more than one MAC address. In response to detection of a data packet, such as data packet 98, that is sourced by IPX device 56 and destined for MPS 30, MPC 42 captures the source-route information from the routing information field (RIF) within the data packet, which specifies the source-route information in an ordered set of route descriptors and ring and bridge numbers. MPC 42 then places the RIF and MAC address of IPX device 56 within the value field of a vendor-private extension of a NHRP/MPOA control frame (e.g., an MPOA resolution request or MPOA purge request) and transmits the NHRP/MPOA control frame to MPS 30. (If an MPOA purge request is utilized, the specified address to purge would be the ATM address of MPS 30.) This NHRP/MPOA control frame with vendor-private extension is designated in FIG. 3 as source-route reply 100.

Of course, as discussed above with respect to FIG. 2, in an alternative embodiment of the present invention, MPC 42 could monitor for all data packets sourced by its end stations and destined for MPS 30 for which shortcuts are established and periodically forward the source-route information for all such data flows to MPS 30. This strategy, however, has a number of disadvantages as compared the request/reply methodology described above. First, MPC 42 may supply unnecessary source-route information to MPS 30 since all data packets from a particular source MAC address are not necessarily sent over a shortcut, even if some of the data packets sourced by an end station having that MAC address are sent over a shortcut. Thus, router 16 may already store the source-route information in its SRC 40. Second, requiring MPC 42 to monitor for a large number of MAC addresses slows the data path and requires additional resources in MPC 42 as compared to embodiments in which MAC addresses are monitored only in response to an explicit request.

In response to receipt of the source-route reply from MPC 42, MPS 30 saves the source-route information in its SRC 40 for at least as long as the hold-down time of MPC 44 since MPC 44 will retry the resolution request after the hold-down time if no resolution reply is received. Importantly, the source-route information is stored in SRC 40 just as if router 16 had received a data packet from IPX device 56 via the default routed path. With the source-route information for IPX device 56 maintained at router 16, MPS 30 is now able to service MPOA resolution requests in accordance with the MPOA protocol. For example, as depicted at reference numeral 102, when MPC 44 retries the resolution request, the resolution request is transmitted over the default routed path to MPS 30 of router 16. In response to receipt of the resolution request, MPS 30 translates the NHRP resolution request into an MPOA imposition request as described in detail in §§ 4.5.2.2 and 5.3.5 of the MPOA specification incorporated by reference above. Importantly, MPS 30 utilizes the cached source-route information for IPX 56 to build the imposition request by inserting the source-route information in the DLL (data-link layer) header field of the MPOA DLL header extension. The DLL header includes the MAC destination address, the MAC source address, a RIF in the case of IEEE 802.5 Token Ring), Ethernet type (in the case of Ethernet), or LLC (in the case of IEEE 802). In addition, the source-route information is utilized by MPS 30 to discover the MPC (i.e., MPC 42) to which to send the MPOA imposition request and with which the MPOA shortcut will be established. The MPOA imposition request is then transmitted from MPS 30 to MPC 42, as indicated at reference numeral 104.

MPC 42 responds to the MPOA imposition request by returning an MPOA imposition reply containing the ATM address of MPC 42 to MPS 30, as indicated at reference numeral 104. Imposition replies are discussed in detail in §§ 4.5.2.3 and 5.3.6 of the MPOA specification. In response to receipt of the imposition reply, MPS 30 translates the imposition reply into an NHRP/MPOA resolution reply 108, which is transmitted via the default routed path to MPC 44. At the end of this process, MPC 44 is prepared to establish and initiate use of an MPOA shortcut utilizing the data ATM address contained in the resolution reply, and MPC 42 is prepared to receive data packets via the MPOA shortcut.

Thus, as shown at reference numeral 110, data packets sourced by IPX device 66 and destined for IPX device 56 are transmitted an MPOA shortcut linking MPC 44 and MPC 42.

After an interval of approximately 10 or 15 minutes (i.e., before the MPOA holding time expires), MPC 44 must revalidate the MPOA shortcut utilized to transmit data packets to IPX device 56. Accordingly, as shown at reference numeral 112, MPC 44 transmits a resolution request to MPS 30 via the default routed path, as described above with respect to reference numeral 94. In response to receipt of the resolution request, MPS 30 searches SRC 40 of router 16 for the source-route to IPX device 56. However, because data packets have been flowing over the shortcut path established between MPCs 42 and 44 for longer than the time out period of the source-route information in SRC 40, the source-route for IPX device 56 will have already been deleted from SRC 40. MPS 30, however, may still access the source-route of IPX device 56 from a DLL header in its MPOA imposition cache (or any other MPOA-defined cache designated to store the source-route) since a shortcut already exits to MPC 42 and the DLL header is stored in the MPOA imposition cache when the MPOA shortcut is established. Utilizing this source-route information, MPS 30 transmits an MPOA imposition request 112 and a source-route request 114 to MPC 42. As described above with respect to reference numerals 106 and 108, MPC 42 responds to the imposition request with an imposition reply 116, which MPS 30 translates into a resolution reply 118 that is sent to MPC 44 to reestablish the shortcut from MPC 44 to MPC 42. MPC 42 also begins monitoring data packets bypassing MPS 30 for the MAC address of IPX device 56. As described above with respect to reference numeral 100, in response to detecting a data packet (e.g., data packet 120) bypassing MPS 30 that has the MAC address of IPX device 56, MPC 42 captures the source-route information from the data packet and furnishes the source-route information to MPS 30 in a source-route reply 122. MPS 30 responds to source-route reply 122 by comparing the source-route contained therein with that MPS 30 supplied in imposition reply 116 (which is stored in the imposition cache of MPS 30) in order to verify that the source-route of IPX device 56 has not changed. If the source-route has not changed, no further action is taken by MPS 30. If the comparison reveals that the source-route has changed, MPS 30 sends an MPOA purge request to MPS 32 and MPC 44 to purge the stale source-route from storage in router 18 and MPOA edge device 26. In any event, data packets continue to flow from MPC 44 to MPC 42 via an MPOA shortcut as shown at reference numeral 124, where the data packets contain either the same or updated source-route information for IPX device 56.

Although MAC addresses are often unique throughout a data communication internetwork, it is possible that the same MAC address is utilized to identify end stations within two different legacy LANs due to the local administration of MAC addresses. In data communication internetworks in which end stations in different legacy LANs are assigned the same MAC, additional mechanisms are required in order to ensure that the proper source-route information is associated with end stations by MPSs. In particular, MPCs need to be supplied with the ELAN ring number associated with the MPS that made a source-route request, and the requesting MPS requires the identity of the legacy LAN associated with the source-route the MPS receives from the MPC in the source-route reply. Because multiple ELANs can connect the same MPC and MPS and the same ATM VCC may be employed to send the vendor-private extensions for both ELANs, the ELAN ring number and the layer-3 network address must be specified in the source-route request sent from the MPS and the source-route reply sent from the MPC. The MPC would monitor and match on both the end station MAC address and the ELAN ring number specified in the vendor-private extension before supplying a source-route to the MPS. In this scenario, the MPC doesn't utilize the layer-3 network address in the source-route request; the MPC simply returns the layer-3 network address to the MPS in the source-route reply. In response to receipt of the source-route reply, the MPS uses the source-route on the ELAN associated with the legacy LAN network identified in the source-route reply.

As has been described, the present invention provides improved communication in a data communication internetwork in which a shortcut communication path that bypasses a default router is utilized to communicate data packets between end stations. In accordance with the present invention, a bridge that is interposed between a source station and its default router and that is responsible for sourcing data on the shortcut communication path supplies source-route information regarding the source station to the default router either in response to an explicit request or of its own initiative. In this manner, the default router is able to both efficiently route data packets to the source station via a default routed path and to participate in the establishment of a shortcut communication path in the reverse direction, that is, to the source station.

While the invention has been particularly shown and described with reference to an illustrative embodiment, it will be understood by those skilled in the art that various changes in form and detail may be made therein without departing from the spirit and scope of the invention. For example, although the present invention has been described with respect to an illustrative embodiment in which IPX is employed in the context of an MPOA network, it should be understood that the present invention is also applicable to other network protocols. Moreover, although the present invention has heretofore been described with respect to a communication internetwork including both software and hardware, it should be understood that the present invention may also be implemented as a program product for use with a data processing system. Programs defining the functions of the present invention can be delivered to a data processing system via a variety of signal-bearing media, which include, without limitation, non-writable storage media (e.g., CD-ROM), writable storage media (e.g., a floppy diskette or hard disk drive), and communication media, such as computer and telephone networks. It should be understood, therefore, that such signal-bearing media, when carrying or encoding computer readable instructions that direct the functions of the present invention, represent alternative embodiments of the present invention.

What is claimed is:

1. A method of operating a communication network, said method comprising:
   defining a default communication path between a source and a destination, said default communication path including at least one router that stores source-route information;
   establishing a connection between said source and said destination via a shortcut communication path including a network entity interposed between said source and said router, wherein data conveyed between said source and said destination via said shortcut communication path bypasses said router;
   after said connection has been established, said network entity transmitting a control frame originating at said network entity to said router, wherein said control frame contains source-route information regarding said source; and
   in response to receipt of said control frame, said router extracting said source-route information from said control frame and writing said source-route information extracted from said control frame into data storage at said router.

2. The method of claim 1, wherein said network entity comprises a bridge interposed between said source and said router, and wherein transmitting said control frame further comprises transmitting said control frame from said bridge to said router only in response to receipt at said bridge of a source-route request from said router.

3. The method of claim 1, said communication network further including a server residing in said router and a client, wherein establishing a shortcut communication path comprises establishing a shortcut communication path bypassing said server between said client and said destination.

4. The method of claim 3, wherein transmitting said control frame comprises transmitting said control frame from said client to said server.

5. The method of claim 3, and further comprising extracting said source-route information from data packets received by said client from said source that are addressed to said destination.

6. The method of claim 3, wherein said communication network includes an asynchronous transfer mode (ATM) network, and wherein transmitting said control frame further comprises transmitting a multi-protocol over ATM (MPOA) packet with an extension containing said source-route information.

7. The method of claim 2, and further comprising:
   in response to receipt by said router of a request to establish a shortcut communication path to said source that bypasses said server, building an imposition request utilizing said source-route information;
   identifying said client utilizing said source-route information; and
   transmitting said imposition request from said server to said client.

8. The method of claim 1, and further comprising:
   thereafter, in response to receipt at said router of a data packet having said source as an intended recipient, routing said data packet to said source utilizing said source-route information stored at said router.

9. The method of claim 1, and further comprising:
   after said shortcut communication pat has been established, purging said source-route information from said router.

10. A communication network, comprising:
    a source and a destination;
    a default router of said source, wherein a default communication path between said source and said destination includes said default router; and
    a bridge interposed between said source and said default router that supports a connection between said source and said destination via a shortcut communication path such that data packets transmitted over said shortcut communication path bypass said default router, wherein said bridge transmits a control frame containing source-route information regarding said source to said default router after said connection via said shortcut communication path has been established, said control frame originating at said bridge.

11. The communication network of claim 10, said communication network further including a server residing in said default router and a client residing in said bridge, wherein said shortcut communication path extends between said client and said destination.

12. The communication network of claim 11, wherein said bridge supplies said source-route information to said default router in a control frame transmitted from said client to said server.

13. The communication network of claim 11, wherein said client extracts said source-route information from data packets received by said client from said source that are addressed to said destination.

14. The communication network of claim 11, wherein said communication network includes an asynchronous transfer mode (ATM) network, and said control frame is a multi-protocol over ATM (MPOA) packet with an extension containing said source-route information.

15. The communication network of claim 11, wherein said default router builds an imposition request and identifies said client utilizing said source-route information received from said bridge.

16. The communication network of claim 10, wherein said default router routes received data packets to said source utilizing said source-route information stored at said default router.

17. The communication network of claim 10, wherein said bridge supplies said source-route information to said default router only in response to receipt at said bridge of a source-route request from said default router.

18. The communication network of claim 10, wherein said default router purges said source-route information from said router after said shortcut communication path has been established.

19. A bridge for a communication network including a source, a destination, and a default router for said source, said bridge comprising:

data processing hardware; and a client run by said data processing hardware, wherein said client supports a connection between said source and said destination via a shortcut communication path such that data packets transmitted over said connection via said shortcut communication path bypass said default router, and wherein said client transmits a control frame containing source-route information regarding said source to said default router after said connection via said shortcut communication path has been established, said control frame originating at said bridge.

20. The bridge of claim 19, wherein said client supplies said source-route information to said default router in a control frame.

21. The bridge of claim 20, wherein said communication network includes an asynchronous transfer mode (ATM) network, and said control frame is a multi-protocol over ATM (MPOA) packet with an extension containing said source-route information.

22. The bridge of claim 19, wherein said client supplies said source-route information to said default router only in response to receipt at said bridge of a source-route request from said default router.

23. The bridge of claim 19, wherein said client extracts said source-route information from data packets received by said bridge from said source that are addressed to said destination.

24. A program product, comprising:

a data processing system-usable medium; and a client encoded within said data processing system-usable medium, wherein said client supports a connection between said source and said destination via a shortcut communication path such that data packets transmitted over said connection via said shortcut communication path information regarding said source to said default router after said connection via said shortcut communication path has been established, said control frame originating at said client.

25. The program product of claim 24, wherein said client supplies said source-route information to said default router in a control frame.

26. The program product of claim 25, wherein said communication network includes an asynchronous transfer mode (ATM) network, and said control frame is a multi-protocol over ATM (MPOA) packet with an extension containing said source-route information.

27. The program product of claim 24, wherein said client supplies said source-route information to said default router only in response to receipt at said bridge of a source-route request from said default router.

28. The program product of claim 24, wherein said client extracts said source-route information from data packets received by said bridge from said source that are addressed to said destination.

* * * * *